(12) United States Patent
Takiguchi

(10) Patent No.: US 7,346,464 B2
(45) Date of Patent: Mar. 18, 2008

(54) GAIT WAVEFORM FEATURE EXTRACTING METHOD AND INDIVIDUAL IDENTIFICATION SYSTEM

(75) Inventor: Kiyoaki Takiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 10/527,847

(22) PCT Filed: Oct. 28, 2003

(86) PCT No.: PCT/JP03/13774

§ 371 (c)(1),
(2), (4) Date: Mar. 15, 2005

(87) PCT Pub. No.: WO2004/040501

PCT Pub. Date: May 13, 2004

(65) Prior Publication Data
US 2006/0158173 A1 Jul. 20, 2006

(30) Foreign Application Priority Data
Oct. 29, 2002 (JP) .............................. 2002-314920

(51) Int. Cl.
*G06K 9/00* (2006.01)
(52) U.S. Cl. ............................ 702/70; 702/66; 702/67; 702/68; 702/69; 702/71; 702/72; 702/73; 702/74; 702/75; 702/150; 702/152; 702/189; 73/172; 324/73.12; 324/76.13; 340/658; 340/944; 340/870.26
(58) Field of Classification Search .................. 702/70, 702/75, 66, 73, 150, 152, 189; 73/172; 324/76.12–76.13; 340/658, 944, 870.26
See application file for complete search history.

(56) References Cited

U.S. PATENT DOCUMENTS 6,360,597 B1 3/2002 Hubbard, Jr.

(Continued)

OTHER PUBLICATIONS

Morris S J et al: "Shoe-integrated sensor system for wireless gait analysis and real-time feedback" Conference Proceedings. Second Joint EMBS-BMES Conference 2002. 24th Annual International Conference of the Engineering in Medicine and Biology Society. Annual Fall Meeting of the Biomedical Engineering Society (Cat. No. 02CH37392), Conference Proceed, pp. 2468-2469, vol. 3, 2002.

(Continued)

*Primary Examiner*—John Barlow
*Assistant Examiner*—Sujoy Kundu
(74) *Attorney, Agent, or Firm*—Oblon, Spivak, McClelland, Maier & Neustadt, P.C.

(57) ABSTRACT

A gait waveform feature extracting method and an individual identification system extract features of the gait waveform. A one-step waveform corresponding to one step of a walking movement is specified using, as an index, a peak amplitude corresponding to a state where substantially a whole bottom surface of one foot is in contact with the ground and a toe of the other foot is just after leaving the ground among the electric field displacement formed on the human body in accordance with the human body's walking movements. Based on the specified one-step waveform, the features of the one-step waveform are extracted, so that the peak amplitude appears without influence from electric-charge interference between the right and left legs. Accordingly, the one-step waveform reflects the actual one step of the walking movement, and therefore, the features of the one-step waveform can be precisely extracted.

20 Claims, 12 Drawing Sheets

U.S. PATENT DOCUMENTS

2002/0107649 A1* 8/2002 Takiguchi et al. ............ 702/75

OTHER PUBLICATIONS

Cattin P C et al: "Sensor fusion for a biometric system using gait" Conference Documentation International Conference on Multisensor Fusion and Integration for Intelligent Systems, MFI 2001 (Cat. No. 01TH8590), Proceedings on International Conference on Multi-Sensor Fusion and Integration for Intelligent Systems, Bade, pp. 233-238, 2001.

J. Paradiso et al.: "Design and Implementation of Expressive Fottwear" IBM Systems Journal, vol. 39, No. 3/4, pp. 511-529, 2000.

* cited by examiner (A) TAKING OFF PROCESS (B) KICKING PROCESS (C) CONTACTING THE GROUND PROCESS

GAIT WAVEFORM FEATURE EXTRACTING METHOD AND INDIVIDUAL IDENTIFICATION SYSTEM

FIELD OF THE INVENTION

The present invention relates to a gait waveform feature extracting method and an individual identification system, and is suitably applied to an individual identification system for identifying individuals based on electric field displacement formed on a human body in accordance with his/her walking movements.

DISCUSSION OF THE BACKGROUND

Recently, there are individual identification systems for identifying individuals by extracting biometric features peculiar to a human body such as an iris of an eye, a finger print, or a handprint and by performing a prescribed matching process based on the extracted results.

In addition, in recent years, human walking movements itself have been focused on as one biometric feature peculiar to a human body For example, there is an individual identification system for identifying individuals based on extracted results obtained by extracting biometrics features through a frequency analysis on acoustic oscillation (sound) generated by walking movements.

This individual identification system requires a microphone (acoustic to electric transducer) to be placed on a human body to detect a walking cycle using, as an index for one step, a subset of electric signals obtained by collecting acoustic oscillation energy during his/her walking movements through the microphone. The subset of signals representing acoustic oscillation at a moment of a foot landing generated by an impact caused when one foot part lands on the ground is gathered and then a system is used to extract features of a gait waveform peculiar to the body based on the detected results. (See, US Patent Publication US2002/0107649A1 (e.g., FIGS. 6 and 7), the entire contents of which being incorporated herein by reference.)

However, in this individual identification system, the acoustic oscillation at the point of landing varies according to the part of the body on which the microphone is placed. In addition, the electrical part representing the oscillation at landing cannot be accurately specified due to major influences from acoustic and electrical noise around the microphone, and accordingly it is difficult to precisely extract features of the gait waveform.

SUMMARY OF THE INVENTION

The present invention is made in consideration of the above points and proposes a gait waveform feature extracting method and an individual identification system for precisely extracting features of a gait waveform.

To solve the above-described and other problems, the present invention specifies a one-step waveform from electric field displacement formed on a human body in accordance with his/her two-leg-walking movements, using, as an index, a peak amplitude within a prescribed frequency band representing a state where a whole bottom surface of one foot is in contact with the ground and a toe of the other foot is just after leaving the ground. This one-step waveform represents one step of the two-leg-walking movements, and then extracts the features of the one-step waveform.

With this invention, the peak amplitude of the output signal appears without influence from electric-charge interference between the right and left legs. This peak amplitude is then used as an index regardless of walking pattern differences due to differences between the right and left legs or differences among individuals, so that one step can be near accurately specified.

DETAILED DESCRIPTION OF THE INVENTION

Hereinafter, one embodiment of the present invention will be described in detail with reference to the attached drawings.

Construction of Individual Certification System

Figure 1:
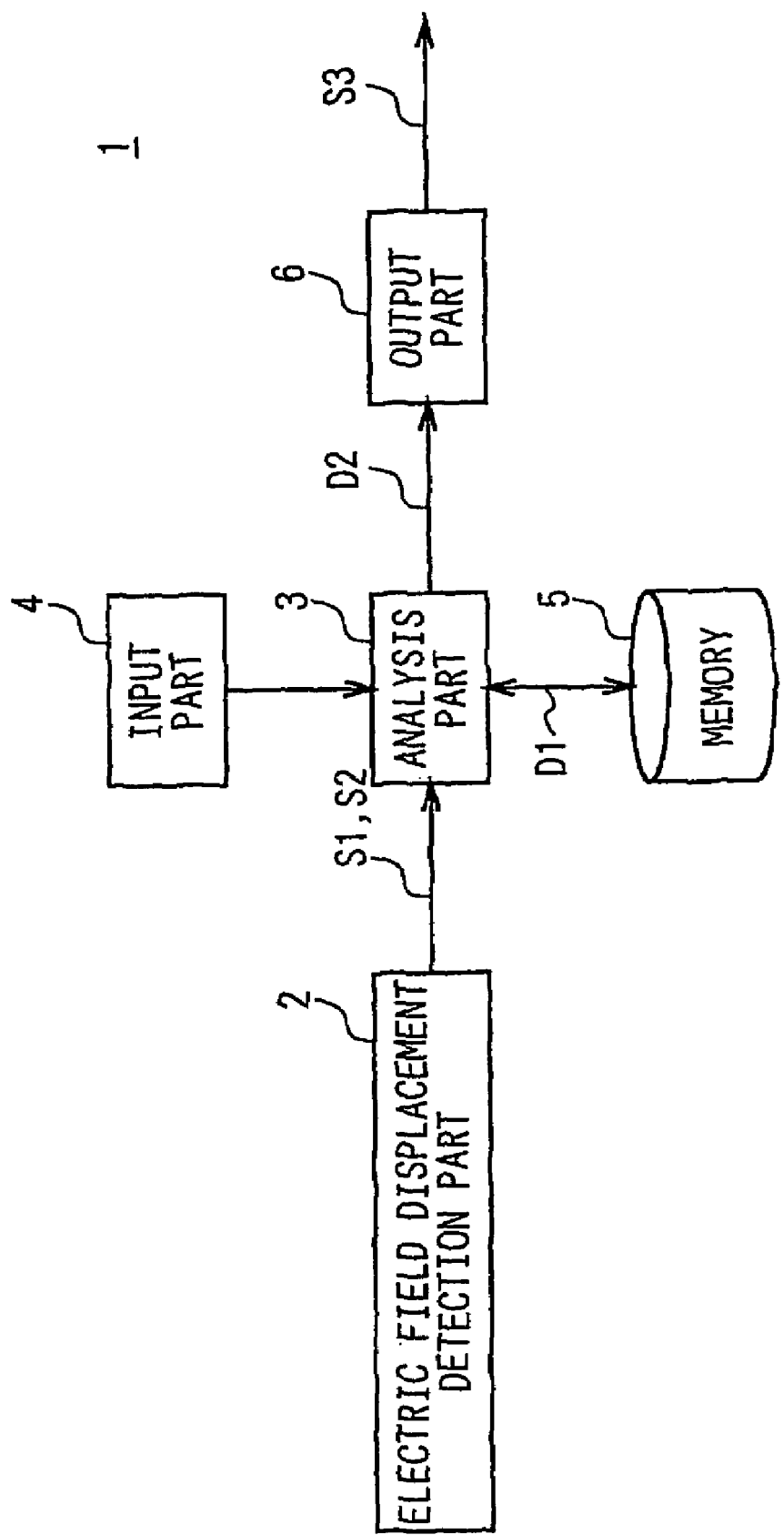
FIG. 1 A block diagram showing the construction an individual identification system which is applied of the present invention FIG. 2 A schematic diagram showing the construction of an electric field displacement detection part according to the present invention.

In FIG. 1, reference numeral 1 shows an individual identification system as a whole to which the present invention is applied. The system includes an electric field displacement detection part 2, an analysis part 3 connected (via wired or wireless mechanisms) to the electric field displacement detection part 2, and an input part 4, a memory 5, and an output part 6 connected to the analysis part 3. The system is formed so that the entire system, or at least the electric field displacement detection part 2, can directly contact with skin of a human body such as an arm and an ankle. Moreover, the electric field displacement detection part 2 may be configured as a wearable device and be configured as a wristwatch, a ring, jewelry or other wearable configuration such that the detection part 2 substantially contacts the user's outer skin.

The individual identification system 1 is configured to identify individuals by detecting changes such as a change of an electrostatic capacity formed between bottom surfaces of feet and a road (or other) surface in accordance with human walking movements. Changes in electric field displacement formed on a human body are caused by changes, for example, in movement of electric charges between bottom surfaces of feet and a road surface. The system 1 produces an electric signal (referred to as a gait waveform signal hereafter) S1 at the electric field displacement detection part 2 that is indicative of the change in electric field displacement. The detected gait waveform signal S1 is then analyzed at the analysis part 3.

Here, walking movements in this embodiment means movements where a person walks on an almost flat road (or other) surface without being particularly sensitive about the walking speed. It should be noted that, in the electric field displacement formed on a human body in accordance with his/her walking movements, the frequency is so low and the wavelength is so long that an extremely wide range of electrostatic field is dominant.

Figure 2:
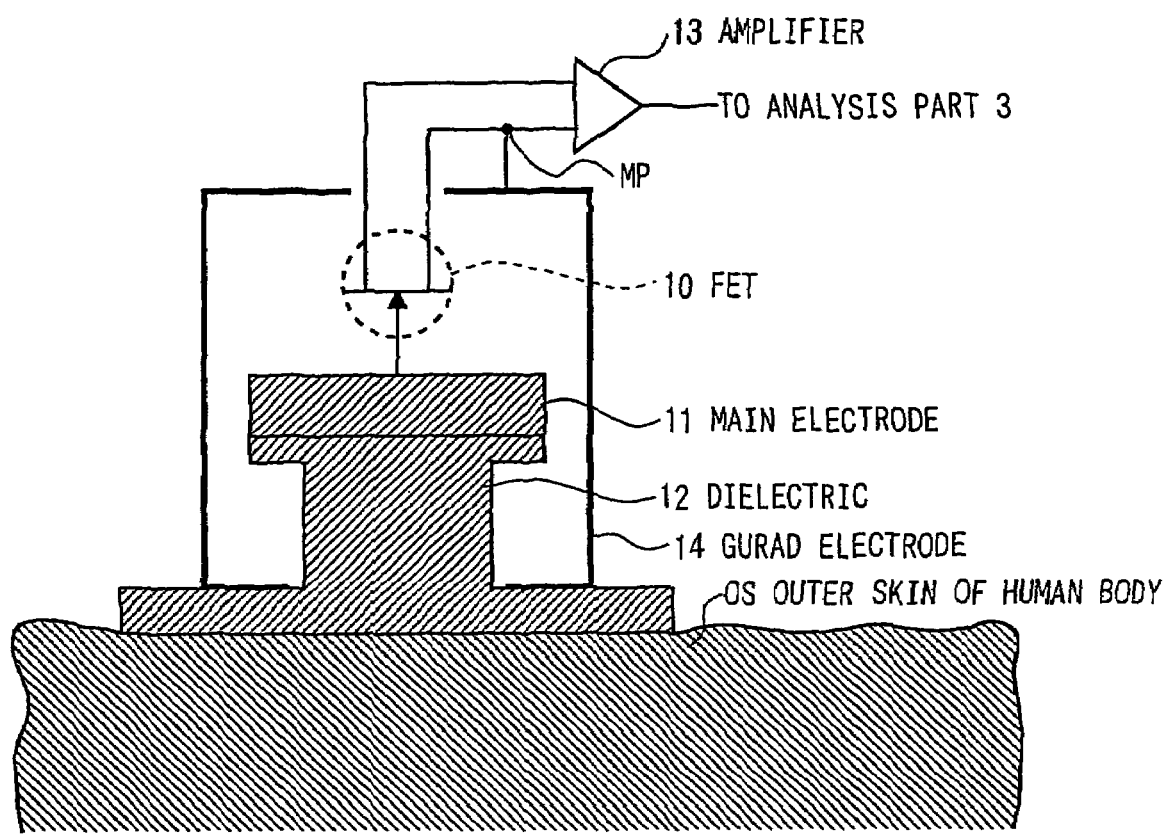

As shown in FIG. 2, the electric field displacement detection part 2 includes a field effect transistor (referred to as a FET hereafter) 10, a main electrode 11 connected to the gate of the FET 10, a dielectric 12 inserted between the main electrode 11 and outer skin of the detection target's body OS, and an amplifier 13 of which one terminal is connected to the source of the FET 10 and the other terminal is connected to the drain of the FET 10 at the same time.

The outer skin of the body, OS, is connected to the middle point MP between the drain of the FET 10 and the other terminal of the amplifier 13 via the dielectric 12. And the amplifier 13 is configured to operate with an internal electrical power source or an electrical power source supplied from outside. Even an active/passive device can be used, where the FET is powered by an external source when the active/passive device is brought near, but not necessarily in contact with, the external source.

Accordingly, when electric field displacement at an extremely low frequency band formed on the detection target's body in accordance with his/her walking movements is transmitted on the outer skin of the body OS, the electric field displacement detection part 2 detects a low current corresponding to the electric field displacement via the FET 10 by the potential generated between the dielectric 12 and the main electrode 11, then sends the detected low current to the analysis part 3 (FIG. 1) as a gait waveform signal S1 via the amplifier 13.

In this case, in the electric field displacement detection part 2, the electric field displacement formed on the body is at an extremely low frequency band, therefore, the electric field displacement formed in accordance with his/her walking movements can be precisely detected with almost no influence from noise, such as a hum noise, created by stray fields and other sources.

Furthermore, the electric field displacement detection part 2 can sensitively detect the electric field displacement formed in accordance with the detection target's walking movements by directly connecting the dielectric 12 with his/her outer skin OS, and still further, by forming the dielectric 12 with materials having a high dielectric constant such as soft polyvinyl chloride, so that the electric field displacement formed in accordance with the walking movements can be detected sensitively.

As described above, the electric field displacement measuring instrument 2 can detect electric field displacement without irradiating search beams such as microwave on the body of a detection target person. In addition to the above mentioned construction, the electric field displacement detection part 2 is configured to be grounded (or earthed) to the outer skin of a body OS via a guard electrode 14 that surrounds both the FET 10 and the main electrode 11 while being grounded to the outer skin of the body OS via the middle point MP. This grounding may take place in of several ways, including a separate conductive member (such as a lead or a tab) that interconnects the guard electrode to the OS, or by forming a bottom portion of the guard electrode 14 to partially wrap around an underside of the dielectric 12 so as to contact the OS. Alternatively, the guard electrode need not physically contact the OS.

With this construction and with the guard electrode 14, the electric field displacement detection part 2 can avoid detecting frequency elements (noises) other than electric field displacement formed in accordance with the human walking movements as much as possible.

The gait waveform signal S1 detected by the electric field displacement detection part 2 as described above, as shown in FIG. 3, at the low frequency band on and under 20 Hz, shows a strong and weak pattern of electric field strength just like a voiceprint as time goes by.

Here, a corresponding relationship between changes of electric field strength (electric potential) and a pattern of human walking movements (referred to as a walking pattern hereafter) will be discussed. First, as a basic assumption, a human walking pattern and a mechanism of generating electric field strength will be explained.

Figure 4:
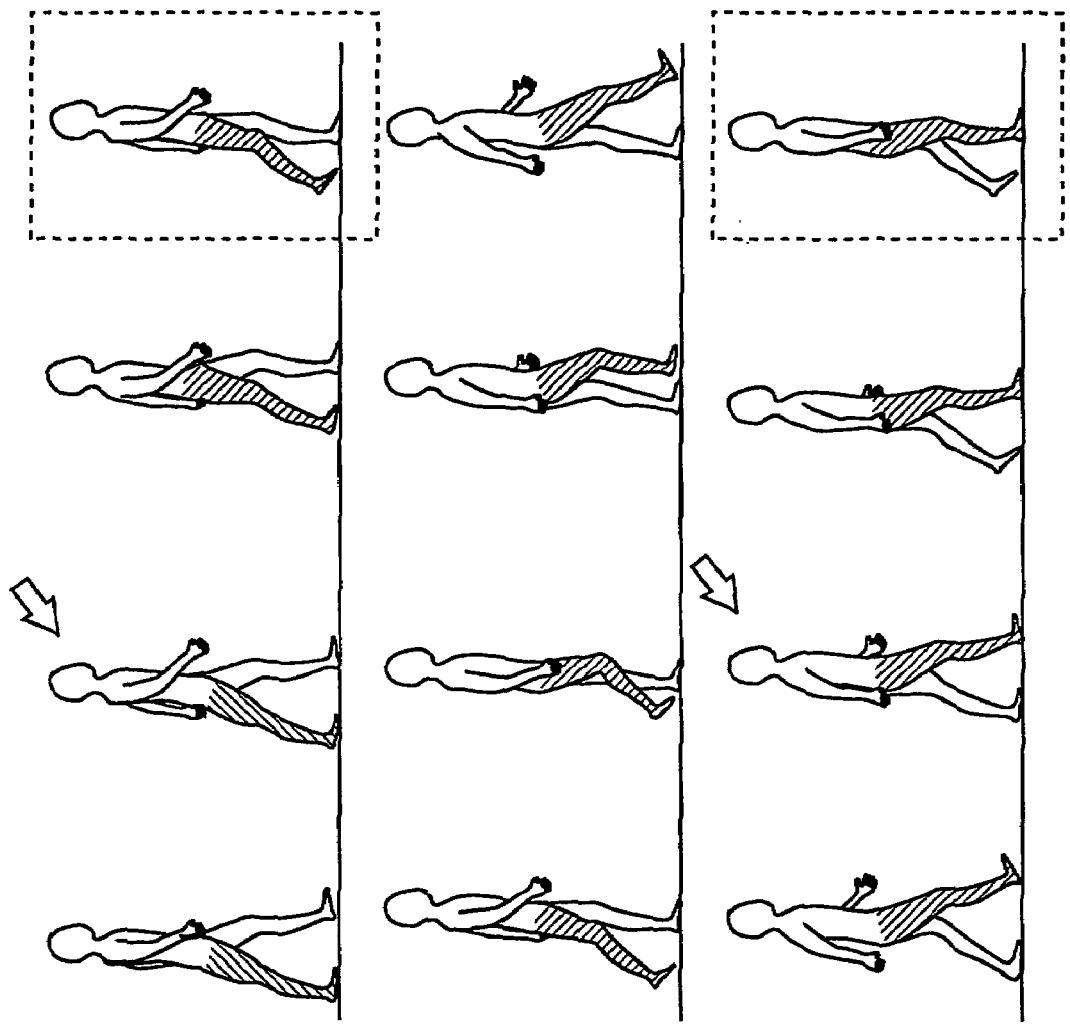
FIG. 4 A schematic diagram showing a walking pattern.

In a human walking pattern of a right leg, as shown in FIG. 4, roughly three kinds of processes are sequentially repeated: a taking off process which starts just after the right heel leaves the ground (which means leaving the road surface, and likewise hereafter) and ends right after the right toe leaves the ground (FIG. 4A); a kicking process which starts just after the right toe leaves the ground and ends right before the right heel lands on the ground (FIG. 4B); and a landing process which starts just after the right heel lands on the ground and ends when the whole bottom surface of the right foot becomes in contact with the ground (referred to as a completed landing hereafter) (FIG. 4C).

On the other hand, in a human walking pattern of the left leg, roughly three kinds of processes are sequentially repeated in the same manner as the right leg, however, the start timing of each process is different from the right leg. A "contacting the floor" process starts in the middle of the right leg's taking off process (shown by an arrow in FIG. 4A), and a taking off process starts in the middle of the right leg's landing process (shown by an arrow in FIG. 4C).

As described above, in human walking movements, each process of right and left legs is alternatively repeated to make him/her go forward, where the left leg's taking off process is near-half-cycle behind the right leg's landing process, and the left leg's landing process is near-half-cycle behind the right leg's taking off process.

Next, the mechanism of generating electric field strength (electric potential) will be explained.

By the following expression, an electrostatic capacity, where C is the electrostatic capacity, $\epsilon$ is the dielectric constant, S is the area of electrodes, and d is the distance between the electrodes,

EXPRESSION 1

$$C = \epsilon \cdot S/d \qquad (1)$$

can be expressed.

Therefore, in human walking movements, the electrostatic capacity C becomes larger as the contact area S of the bottom surfaces of feet in contact with the ground becomes larger, and on the contrary, the electrostatic capacity C becomes smaller as the bottom surfaces of feet leave the ground since an air layer with a smaller dielectric constant is formed corresponding to the distance d between the road surface and the bottom surfaces of feet representing the separated area S.

In other words, each change to a separated area (or contact area) of bottom surfaces of feet in contact with a road surface, each change of the distance between the road surface and the bottom surfaces of feet, and the exchange of electric charges between the road surface and the bottom surfaces of feet (electric-charging interaction) are closely involved in electric field strength of electric field displacement formed in accordance with human walking movements.

Here, by the following expression, the amount of electric charges, where Q is the amount of electric charges and V is the voltage,

EXPRESSION 2

$$Q = C \cdot V \qquad (2)$$

can be expressed.

Here, in human walking movements, the amount of electric charge Q changes very slightly, therefore, it can be assumed that the amount of electric charges Q is constant, which means that the change of the electrostatic capacity C and the change of the voltage V are inversely related.

Therefore, in human walking movements, when the electrostatic capacity C suddenly decreases as a bottom surface of a foot rapidly leaves the road surface during the taking off process (FIG. 4A), a dielectric breakdown of air is exceeded to cause electric-discharging due to a sudden increase of the voltage V between the bottom surface of foot and the road surface.

As described above, in human walking movements, the voltage V increases as the bottom surfaces of feet leave the road surface, and at the same time, electric-discharging occurs between the bottom surfaces of feet and the road surface in accordance with a sudden decrease of the electrostatic capacity C.

Accordingly, in the mechanism of generating electric field strength changing in accordance with human walking movements, the voltage V caused by the potential difference between the bottom surfaces of feet of a body and the road surface is not the only factor, but the electrostatic capacity C is also a factor closely involved.

Taking the above-mentioned basic assumption into consideration, the corresponding relationship between a human walking pattern and changes of electric field strength generated in accordance with human walking movements will be described based on a model where an electrostatic capacity C is formed between bottom surfaces of feet of a body and a road surface.

As such a model, an equivalent circuit is used assuming that a variable capacitor is formed between the road surface and each of four parts of the bottom surfaces of feet, where the four parts are formed by separating the bottom surface of left foot into two: one covering the area starting at the middle of the long direction of the left foot and ending at the left heel; and the other covering the area starting at the middle of the long direction of the left foot and ending at the left toe, and by separating the bottom surface of the right foot into two in the same way as the left foot: one covering the right heel; and the other covering the right toe.

Figure 5:
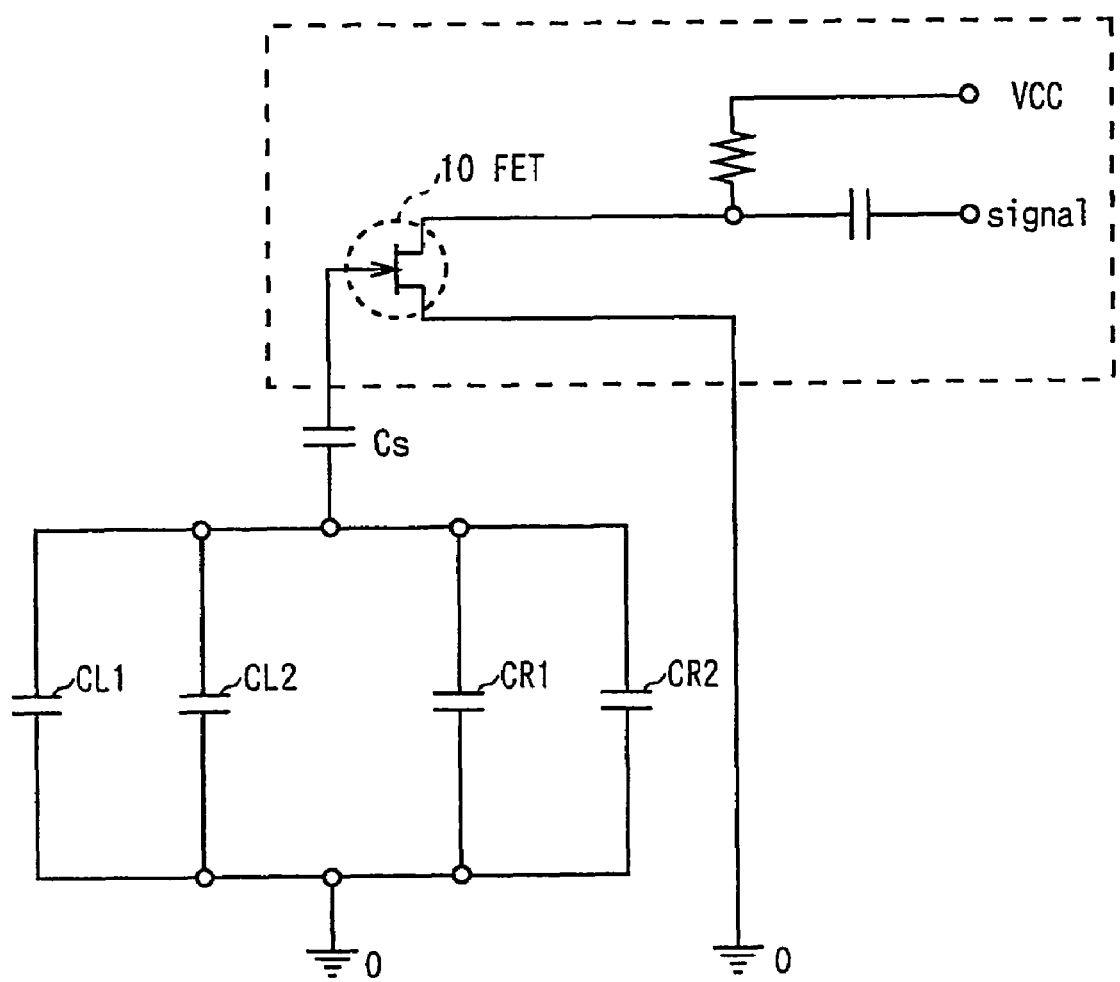
FIG. 5 A schematic diagram showing an equivalent circuit of the electric field displacement detection part.

As shown in FIG. 5, an equivalent circuit 20 has the almost same circuit design as the electric field displacement detection part 2 (FIG. 2), however, it is assumed that, at the gate of the FET 10 in the electric field displacement detection part 2, as replacements of the main electrode 11 and the dielectric 12, there are four variable capacitors connected to the gate of the FET 10: a capacitor CL1 formed between the left heel and the road surface; a capacitor CL2 formed between the left toe and the road surface; a capacitor CR1 formed between the right heel and the road surface; and a capacitor CR2 formed between the right toe and the road surface.

It should be noted that the part inside of the dotted line has the construction of the electric field displacement detection part 2 is simplified for the sake of convenience.

Figure 6:
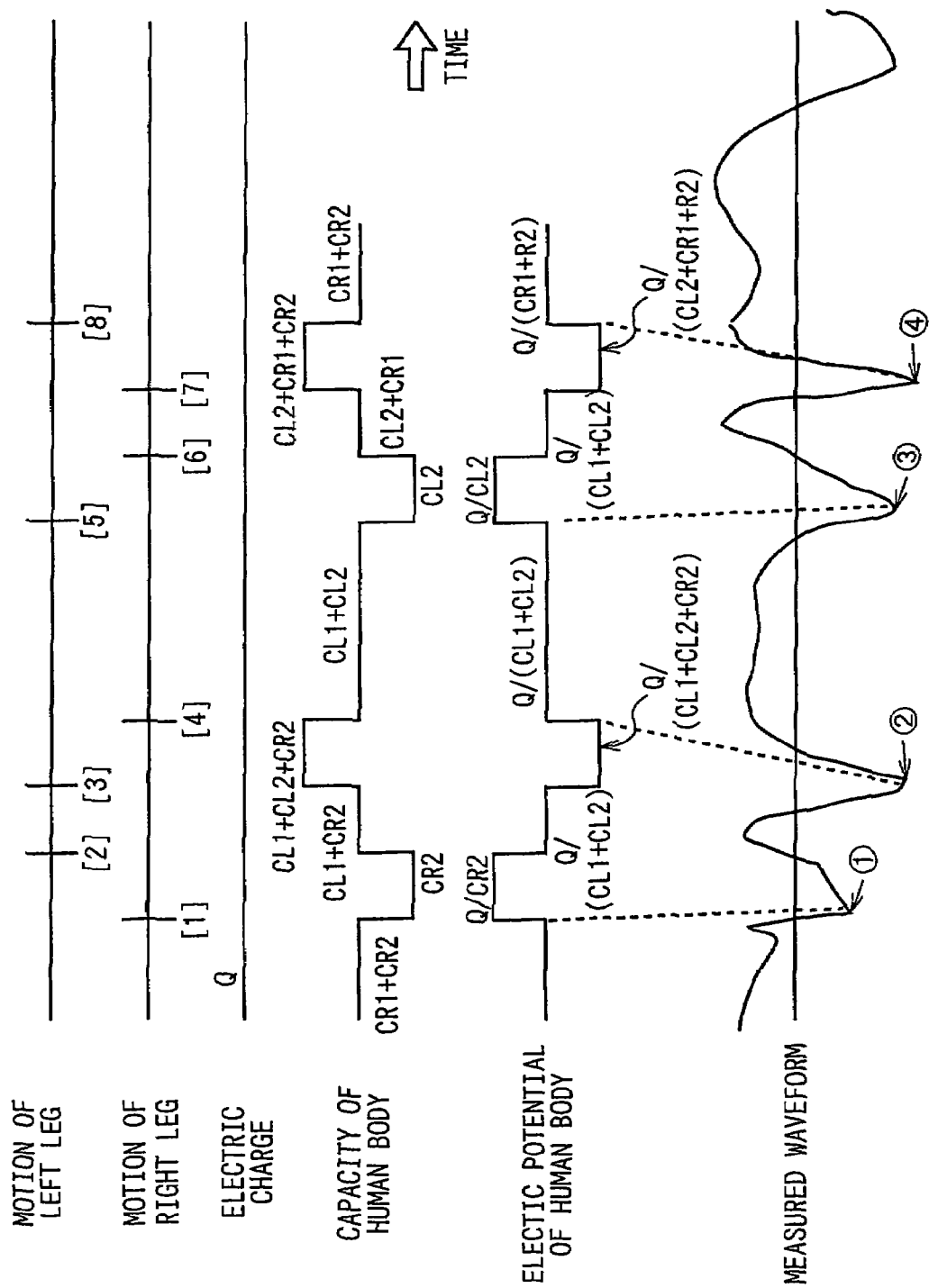
FIG. 6 A timing chart explaining the output signal as a function of walking movements.

Using the equivalent circuit 20, the corresponding relationship among a human walking pattern, a change of the amount of electric charges of a body Q, a change of the electrostatic capacity C formed between bottom surfaces of feet and a road surface, and the change of the voltage V between the bottom surfaces of feet and the road surface (which means the change of the electric field strength of a gait detection signal S1), is described in FIG. 6 as a timing chart, and the description of the timing chart is summarized in table 1.

It should be noted that, for the sake of convenience, leakage resistance of the road surface is ignored, the amount of electric charges of a body Q is regarded as constant since the changes thereof are very small, and it is assumed that the heel and toe clearly separately leave the ground when the bottom surfaces of the foot leave the ground.

In addition, note that a human walking pattern covers the movements starting at the state where the right leg is behind the person's center of mass, and the right heel is at just before leaving the ground (the left-end state shown in FIG. 4A), through the kicking process (FIG. 4B) of the right leg, and ending at the state where the left toe is at just after leaving the ground (the right-end state shown in FIG. 4C).

TABLE 1

| Walking Movements | Changes of Electrostatic Capacity | Electric Potential/ Electric Charges |
|---|---|---|
| [1] A right heel leaves the ground. | Electric-charges by separation occur (electric-discharging) between the bottom surface of the right foot and the road surface at the moment when the right heel leaves the ground. | Electric charges are Q. |
| The right heel is gradually leaving the road surface. | The distance between the right heel and the road surface is getting longer, and the capacitor $C_{R1}$ can be regarded as 0 when the distance becomes long enough. Therefore, the capacity of the body changes from $C_{R1} + C_{R2}$ to $C_{R2}$. | |

TABLE 1-continued

| | | |
|---|---|---|
| [2] The left heel lands on the ground. | The capacity of the body becomes $C_{L1} + C_{R2}$ as the left heel makes the area being in contact with the ground larger. | Electric potential changes to $Q/(C_{L1} + C_{R2})$. |
| [3] The whole bottom surface of the left foot is in contact with the ground. | The capacity of the body becomes $C_{L1} + C_{L2} + C_{R2}$ as the bottom surface of the left foot makes the area being in contact with the ground larger. | Electric potential changes to $Q/(C_{L1} + C_{L2} + C_{R2})$. |
| [4] The right toe leaves the ground. | Electric-charges by separation occur (electric-discharging) between the bottom surface of the right foot and the road surface at the moment when the right toe leaves the ground. | Electric potential is $Q/(C_{L1} + C_{L2} + C_{R2})$. |
| The right toe is gradually leaving the road surface. | The distance between the right heel and the road surface is getting longer, and the capacitor $C_{R2}$ can be regarded as 0 when the distance becomes long enough. Therefore, the capacity of the body changes to $C_{L1} + C_{L2}$. | Electric potential changes to $Q/(C_{L1} + C_{L2})$. |
| [5] The right leg kicks forward, and the left heel leaves the ground before the right heel lands on the ground. | Electric-charges by separation occur (electric-discharging) between the bottom surface of the left foot and the road surface at the moment when the left heel leaves the ground. | |
| The left heel is gradually leaving the road surface. | The distance between the left heel and the road surface is getting longer, and the capacitor $C_{L1}$ can be regarded as 0 when the distance becomes long enough. Therefore, the capacity of the body changes from $C_{L1} + C_{L2}$ to $C_{L2}$. | Electric potential changes to $Q/(C_{L1} + C_{L2})$ from $Q/C_{L2}$. |
| [6] The right heel lands on the ground. | The capacity of the body becomes $C_{L2} + C_{R1}$. | Electric potential changes to $Q/(C_{L2} + C_{R1})$. |
| [7] The whole bottom surface of the right foot is in contact with the ground. | The capacity of the body becomes $C_{L2} + C_{R1} + C_{R2}$. | Electric potential is $Q/(C_{L2} + C_{R1} + C_{R2})$. |
| [8] The left toe leaves the ground. | Electric-charges by separation occur (electric-discharging) between the bottom surface of the left foot and the road surface at the moment when the left toe leaves the ground. | |
| The left toe is gradually leaving the road surface. | The distance between the left toe and the road surface is getting longer, and the capacitor $C_{L2}$ can be regarded as 0 when the distance becomes long enough. Therefore, the capacity of the body changes from $C_{L2} + C_{R1} + C_{R2}$ to $C_{R1} + C_{R2}$. | Electric potential changes from $Q/(C_{L2} + C_{R1} + C_{R2})$ to $Q/(C_{R1} + C_{R2})$. |

Figure 3:
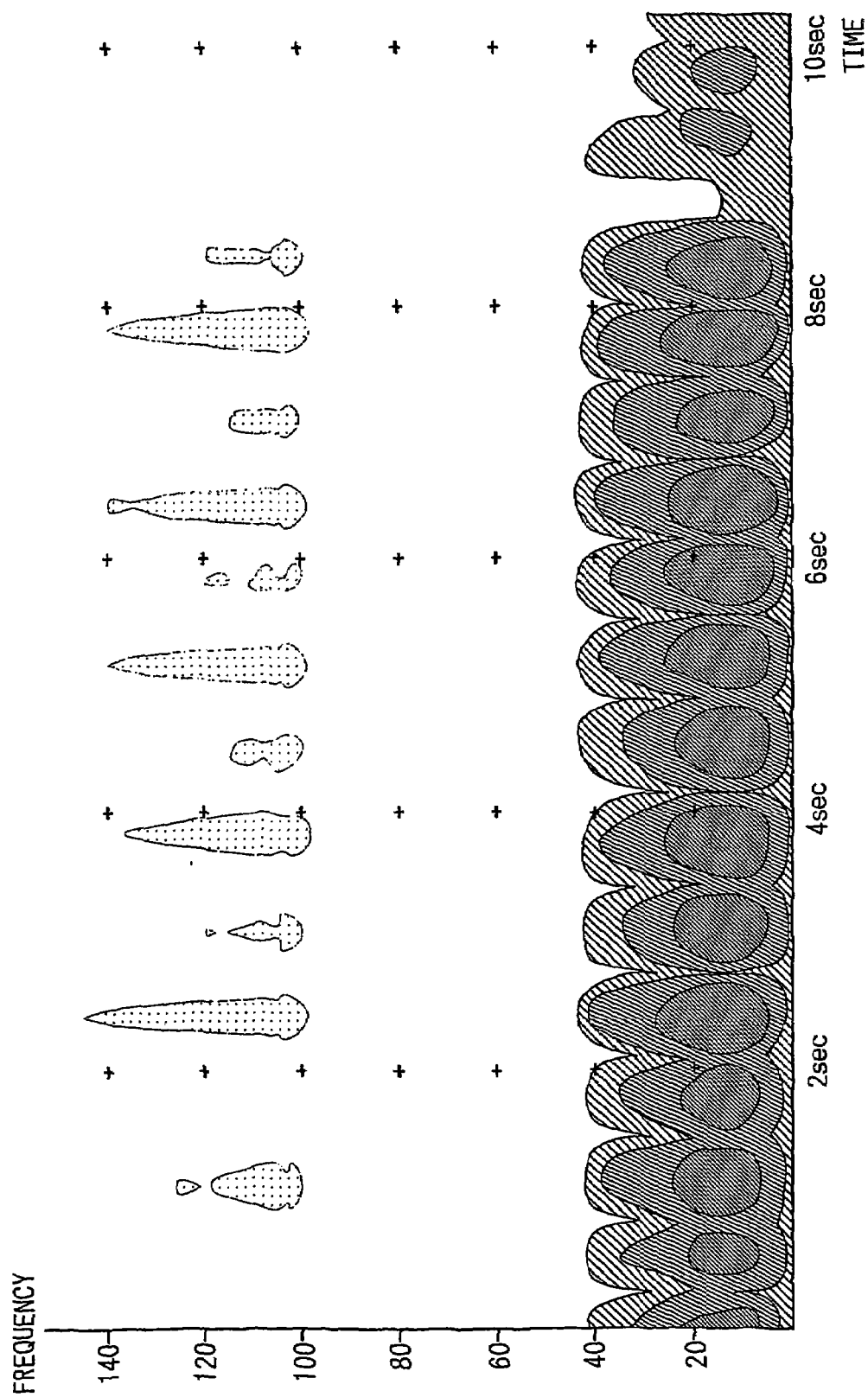
FIG. 3 A schematic diagram showing a spectrograph example.

As described in table 1, the gait waveform shown in FIG. 6 is the result of the changes of the electrostatic capacity and the electric potential changing in accordance with each of the states of the walking patterns repeating alternatively with a near-half-cycle difference (items [1] to [8] of walking movements in table 1), and is corresponding to the strong and weak pattern of electric field strength shown in FIG. 3.

Therefore, the gait waveform appears with a unique pattern while the electrostatic capacity and the electric potential change corresponding to biometrics differences such as differences between right and left legs, or among individuals, and differences of walking patterns such as a walking path.

By the way, in the gait waveform shown in FIG. 6, sharp peak amplitudes (®-Σ at measured waveform in FIG. 6) are seen at times when electric-charges by separation occur (electric-discharging) corresponding to each of the following states: just after the right heel leaves the ground ([1] in FIG. 6, motion of the right leg); just after the right toe leaves the ground ([4] in FIG. 6, motion of the right leg); just after the left heel leaves the ground ([5] in FIG. 6, motion of the left leg); and just after the left toe leaves the ground ([7] in FIG. 6, motion of the left leg).

Such peak amplitudes can be classified into two sets: the first one is the peak seen just after a heel leaves the ground; and the second one is the peak seen just after a toe leaves the ground. As for the first peak, when it is just after the right (or left) heel completely leaves the ground (shown in FIG. 4, inside of the dotted line), the left (or right) foot is airborne and not in contact with the ground.

Therefore, the peak amplitude corresponding to the state where it is just after the right or left heel leaves the ground (® and ™ in FIG. 6) appears relatively apparently by electric-charge separation (electric-discharging), however, is limited by the electric-charge interference between the right and left legs, and as described above, a difference of amplitude is also seen as the state of the electric-charge interference between the right and the left legs changes corresponding to the differences of the walking patterns between the right and left legs.

On the contrary, as for the second peak, when it is just after the right (or left) toe completely leaves the ground (shown in FIG. 4, inside of the dotted line), due to the characteristic of a walking pattern, the left (or right) leg is in a state of a completed landing regardless of the differences of walking patterns.

Therefore, peak amplitude corresponding to the state where it is just after the right or left toe leaves the ground (© and Σ in FIG. 6), appears at about 8 Hz±2 Hz bandwidth with almost no variation as the maximum peak amplitude among the gait waveform since there is no electric-charge interference between the right and left legs. In this case, as for gait waveforms measured for a plurality of test walkers, the peak amplitude at 8 Hz±2 Hz bandwidth (referred to as an 8 Hz peak hereafter) appears in the same peak-amplitude-frequency characteristic.

As described above, the gait waveform of the gait detection signal S1 (FIG. 1) appears with a unique pattern, while the electrostatic capacity and the electric potential change with differences in walking patterns. However, a distinct 8 Hz peak appears at an almost constant interval corresponding to the repetition where the right or left toe leaves the ground, regardless of the differences of walking patterns.

By the way, the analysis part 3 (FIG. 1), by executing a gait waveform registration process at the operation of prescribed registration start operation through the input part 4 (e.g., external interface port, or peripheral device), extracts features of a registration waveform using the above-mentioned 8 Hz peak as an index among the gait waveform signals (referred to as a registration gait waveform signal hereafter) S1 provided from the electric field displacement detection part 2 corresponding to, for example, the walking movements of a person wearing the individual identification system 1 (referred to as a registration person hereafter) during the operation, and then stores the extracted results into the memory 5 as a registration waveform feature data D1.

At this stage, the analysis part 3, by executing a gait waveform matching process at the operation of prescribed matching start operation through the input part 4, at first, extracts features of a matching target waveform using the above-mentioned 8 Hz peak as an index among the gait waveform signals (referred to as a matching gait waveform signal hereafter) S2 provided from the electric field displacement detection part 2 corresponding to, for example, the walking movements of the body wearing the individual identification system 1 (referred to as a matching target person hereafter) during the operation.

Next, the analysis part 3 identifies if the person is a registration person or not by matching the features of the matching target waveform and the features of the registration waveforms of the registration person feature data D1 stored in the memory 5, and then generates and transmits an identification result data D2 representing the identified results.

The output part 6 is configured to generate an output signal corresponding to the acceptance status of the output target circuit (system), and generates an infrared signal S3 by transforming the identification result data D2 provided from the analysis part 3 by, for example, photoelectric transfer, and outputs the signal to outside.

In the memory 5, average interval between peaks information which represents an average interval between an 8 Hz peak and the next 8 Hz peak (referred to as an interval between peaks hereafter) is stored as information which the analysis part 3 uses at the gait waveform registration process or the gait waveform matching process.

In practice, the analysis part 3 is configured to execute the gait waveform registration process and the gait waveform matching process in accordance with an analysis program previously stored in the memory 5 by a control part composed of parts not shown in figures such as a CPU, a ROM and a RAM, but which are contained in the analysis part 3.

The analysis part 3 may be hosted on a personal computer, handheld computer, PDA or other processor-based device that includes a memory, or access (locally or remotely) to a memory. A connection between the electric field displacement detection part 2 and the analysis part 3 may be via a wired connection or a wireless connection. The wired connection may include a physical connector (e.g., USB 2, or other peripheral connector) that enables the electric field displacement detection part 2 to forward collected signals to the analysis part 3 (e.g., store and forward). Alternatively, the electric field displacement detection part 2 may include a wireless transmitter, such as IEEE 802.11a, 802.11b, 802.11g, or Bluetooth transmitter for example. The analysis part 3 includes a compatible receiver for receiving the signal S1 transmitted (via a direct connection or a wireless connection) from the electric field displacement detection part 2.

First, the gait waveform registration process will be explained in detail using the following flowchart.

Gait Waveform Registration Process

Figure 7:
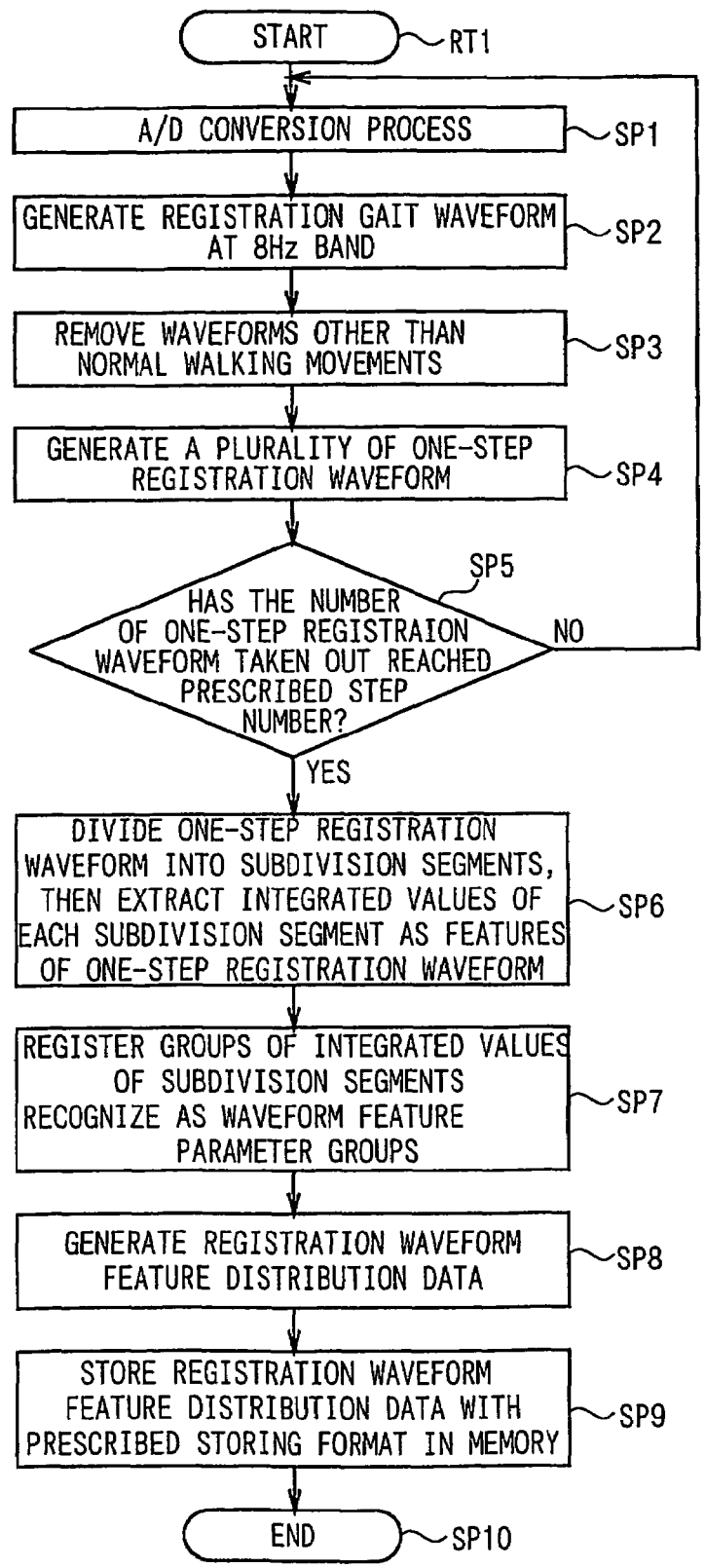
FIG. 7 A flow chart showing a procedure of a gait waveform registration process according to the present invention.

As shown in FIG. 7, the analysis part 3 starts at a start step of a routine RT1, goes on to a step SP1 to generate registration gait waveform data by conducting an A/D conversion process on the registration gait waveform signal S1 (FIG. 2) per prescribed unit of time provided from the electric field displacement detection part 2, then goes on to a next step SP2.

Figure 8:
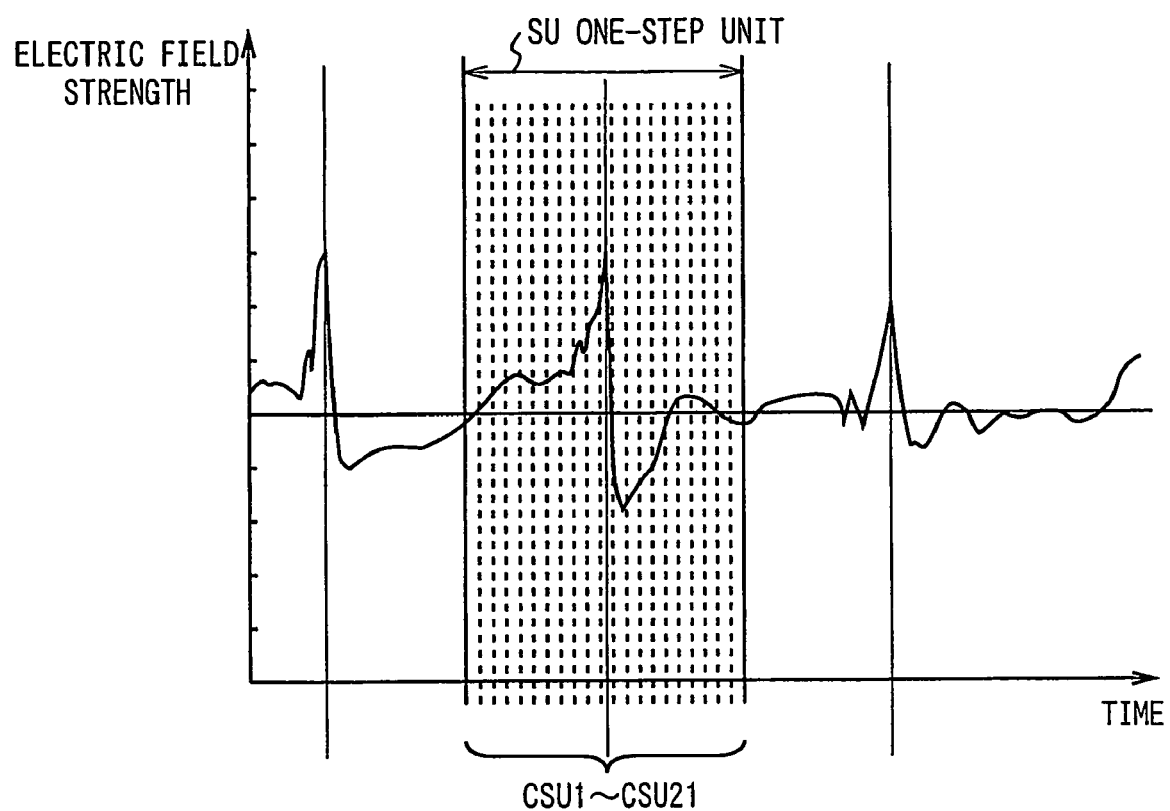
FIG. 8 A schematic diagram illustrating how to identify and divide a one-step waveform.

At the step SP2, the analysis part 3 removes frequency elements at or over 40 Hz (e.g., via a digital low pass filter) which are not analysis targets from the registration gait waveform data, then generates registration gait waveform data at around 8 Hz band as shown in FIG. 8 (referred to as a registration gait waveform at 8 Hz band hereafter) by, for example, a quadrature conversion process such as Fast Fourier Transform (FFT), then goes on to a next step SP3.

At the step SP3, the analysis part 3 removes the waveforms representing movements other than normal walking movements such as walking movements at the start or at the end, or stop movements, from the registration gait waveform at 8 Hz band generated at the step SP2, then goes on to a next step SP4.

In practice, the analysis part 3 is configured to detect an 8 Hz peak appearing in the registration gait waveform at 8 Hz band, and to remove the waveforms which are beyond the prescribed allowable range of the 8 Hz interval between peaks comparing to the average interval between peaks information previously stored in the memory S (FIG. 1) from the detected 8 Hz interval between peaks.

Here, the analysis part 3 is configured to adequately preserve the registration gait waveform at 8 Hz band representing the normal walking movements by removing the waveforms representing movements other than the normal walking movements using, as an index, the 8 Hz peak appearing at an almost constant interval regardless of the differences of the walking patterns.

At the step SP4, the analysis part 3 is configured to specify the length between the center of a standard 8 Hz peak and the middle of 8 Hz peaks in front and behind the standard 8 Hz peak as a unit representing the actual one step of the walking movements (referred to as a one-step unit hereafter) SU. The analysis part 3 also generates a plurality steps of a one-step registration waveform by dividing the registration gait waveform at 8 Hz band obtained at the step SP3 by the one-step section unit SU, then goes on to a next step SP5.

Here, the analysis part 3 is configured to adequately generate a one-step registration waveform representing actual one step of walking movements by dividing the registration gait waveform at 8 Hz band by one-step unit SU specified using an 8 Hz peak as an index.

At the step SP5, the analysis part 3 judges whether the number of steps of the one-step registration waveform taken at the step SP4 has reached the prescribed number (referred to as prescribed number of steps hereafter) or not.

A negative result means that the number of steps of one-step registration waveform taken at the step SP4 is less than the prescribed number of steps, and the analysis part 3 returns to the step SP1 and repeats the above-mentioned process.

On the contrary, an affirmative result at the step SP5 means that the number of steps of one-step registration waveform taken at the step SP4 has reached the prescribed number of steps, and the analysis part 3 goes on to a next step SP6.

At the step SP6, the analysis part 3 divides each of the prescribed number of steps of the one-step registration waveform taken at the step SP4 into subdivision segments at almost even intervals, for example, twenty-one subdivision segments CSU1 to CSU21 respectively.

Then, the analysis part 3 extracts integrated values obtained by integrating amplitude values (values of electric field strength) on the subdivision segments CSU1 to CSU21 as features of the one-step registration waveform, then goes on to a next step SP7.

Figure 9:
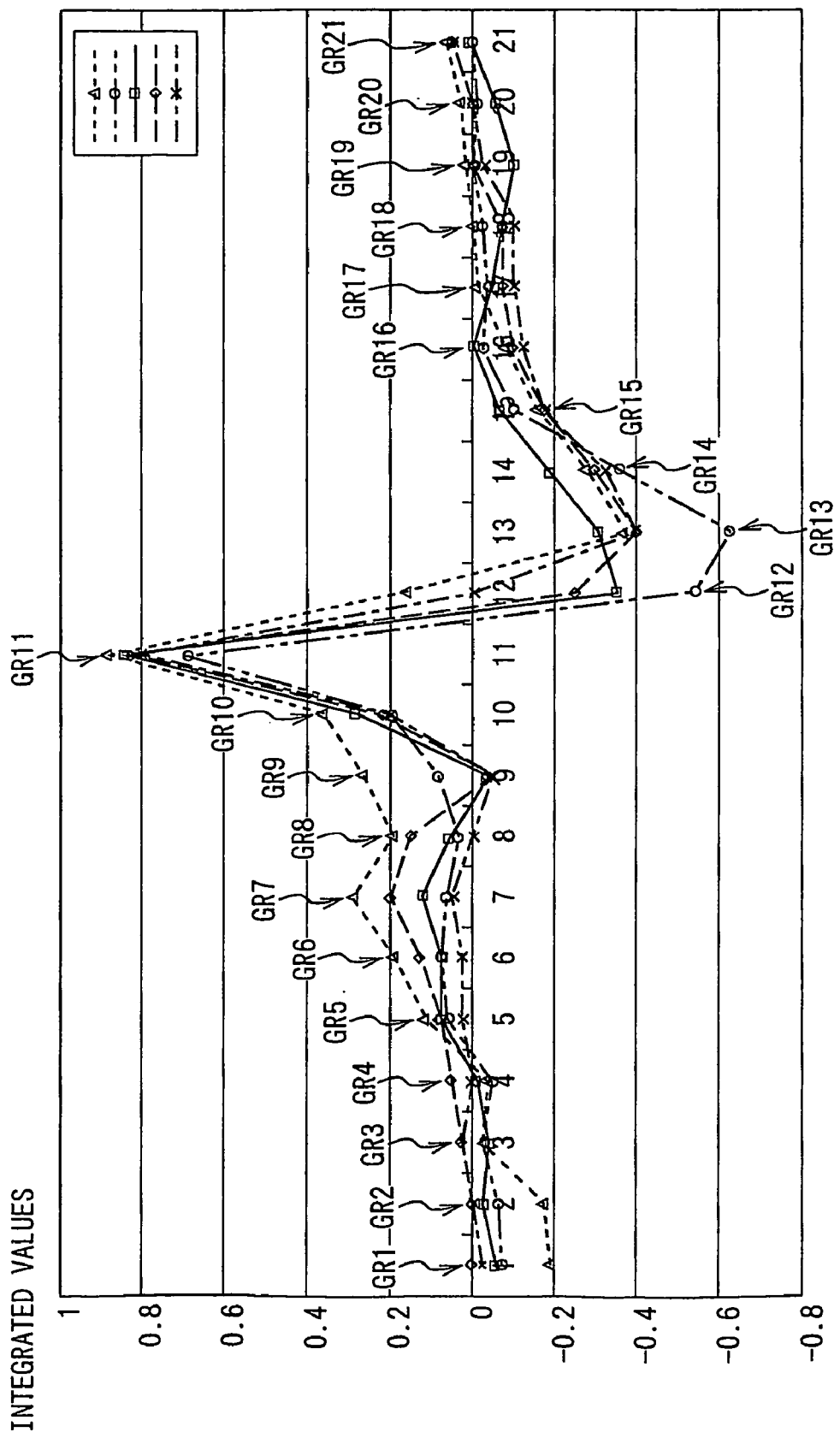
FIG. 9 A schematic diagram showing integrated values in subdivision segments.

Here, FIG. 9 is a graph showing the integrated values obtained when, for example, each of five steps of one-step registration waveform is divided into twenty-one subdivision segments CSU1 to CSU21 respectively. It should be noted that the integrated values are normalized.

One line in FIG. 9 represents one step of one-step registration waveform, as connecting a plurality of integrated values obtained as a result of integrating the one-step registration waveform over each of the twenty-one subdivision segments CSU1 to CSU21, therefore, represents a detailed approximate form of the original one-step registration waveform.

Accordingly, each group of the integrated values of each of the subdivision segments CSU1 to CSU21 forming one line represent the features of the one-step registration waveform peculiar to each of the registration persons. Furthermore, the five groups of integrated values on each of the subdivision section each comprised of subdivision segments CSU1 to CSU21 are the groups of features of each part of the one-step registration waveform, therefore, represent an area certifying the registration person for each part.

At the step SP7, the analysis part 3 identifies each of the ten groups of integrated values on the subdivision sections each comprised of subdivision segments CSU1 to CSU21 as a group of registration waveform feature parameter groups GR1 to GR21 respectively, then goes on to a next step SP8.

Figure 10:
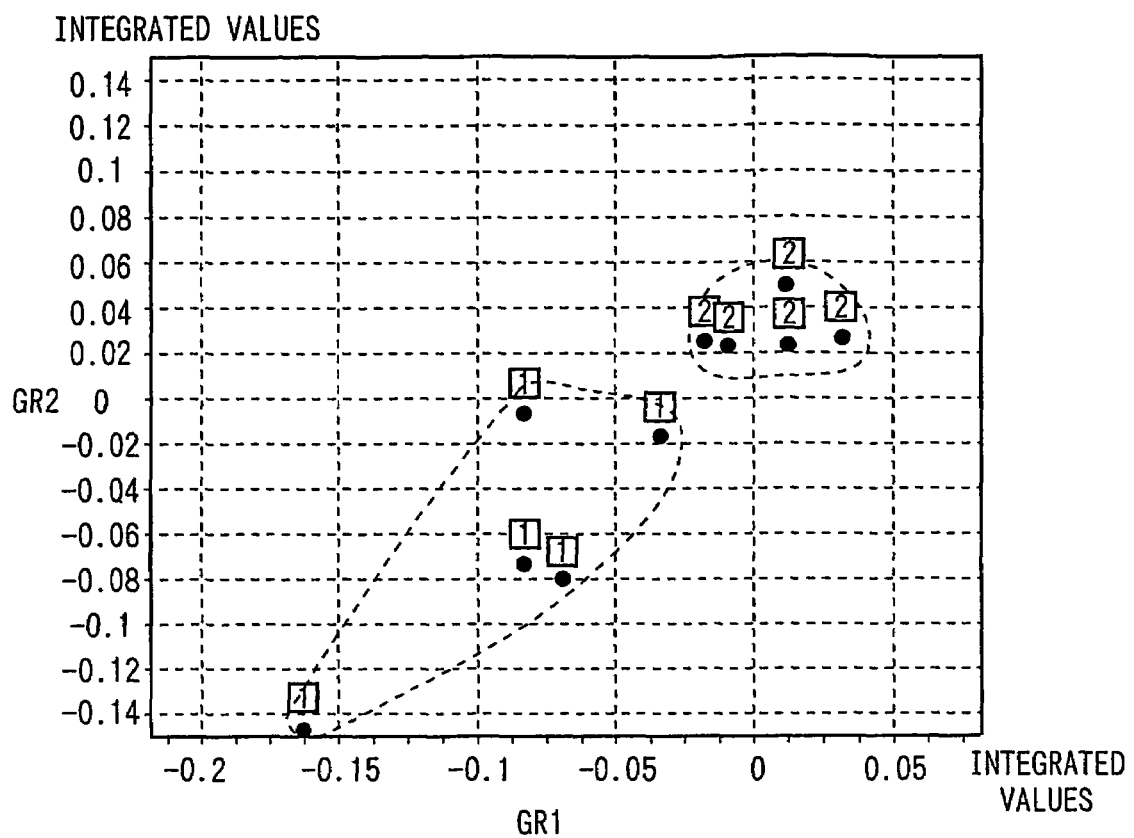
FIG. 10 A schematic diagram showing distribution examples of registration waveform feature parameter groups.

At the step SP8, the analysis part 3, for example as shown in FIG. 10, generates registration waveform feature distribution data representing a distribution state of the registration waveform feature parameter groups GR1 and GR2 on twenty-one-dimensional space, and generates registration waveform feature distribution data of the registration waveform feature parameter groups GR3 to GR21 in the same manner, then goes on to a next step SP9.

It should be noted that FIG. 10 shows a distribution state on two-dimensional space for the sake of convenience. In addition, the analysis part 3 shows a distribution state on twenty-one-dimensional space, however, in practice, is configured to show a distribution state on an x-dimensional space where x is the number of times dividing a one-step registration waveform at the step SP6.

At the step SP9, the analysis part 3 generates registration waveform feature data D2 by converting each of the registration waveform feature distribution data corresponding to each of the registration waveform feature parameter groups GR1 to GR21 generated at the step SP8 into a prescribed data storing format, and stores the data into the memory 5 (FIG. 1), then goes on to a next step SP10 to end the gait waveform registration process.

As described above, the analysis part 3 is configured to take out, at prescribed registration start operation, a one-step registration waveform using an 8 Hz peak as an index, and integrates amplitude values on a plurality of subdivision segments of the one-step registration waveform so that integrated values representing features of the one-step registration waveform peculiar to the registration person can be accurately extracted.

Gait Waveform Matching Process

Next, a gait waveform matching process at the analysis part 3 will be described in detail using the following flowchart.

Figure 11:
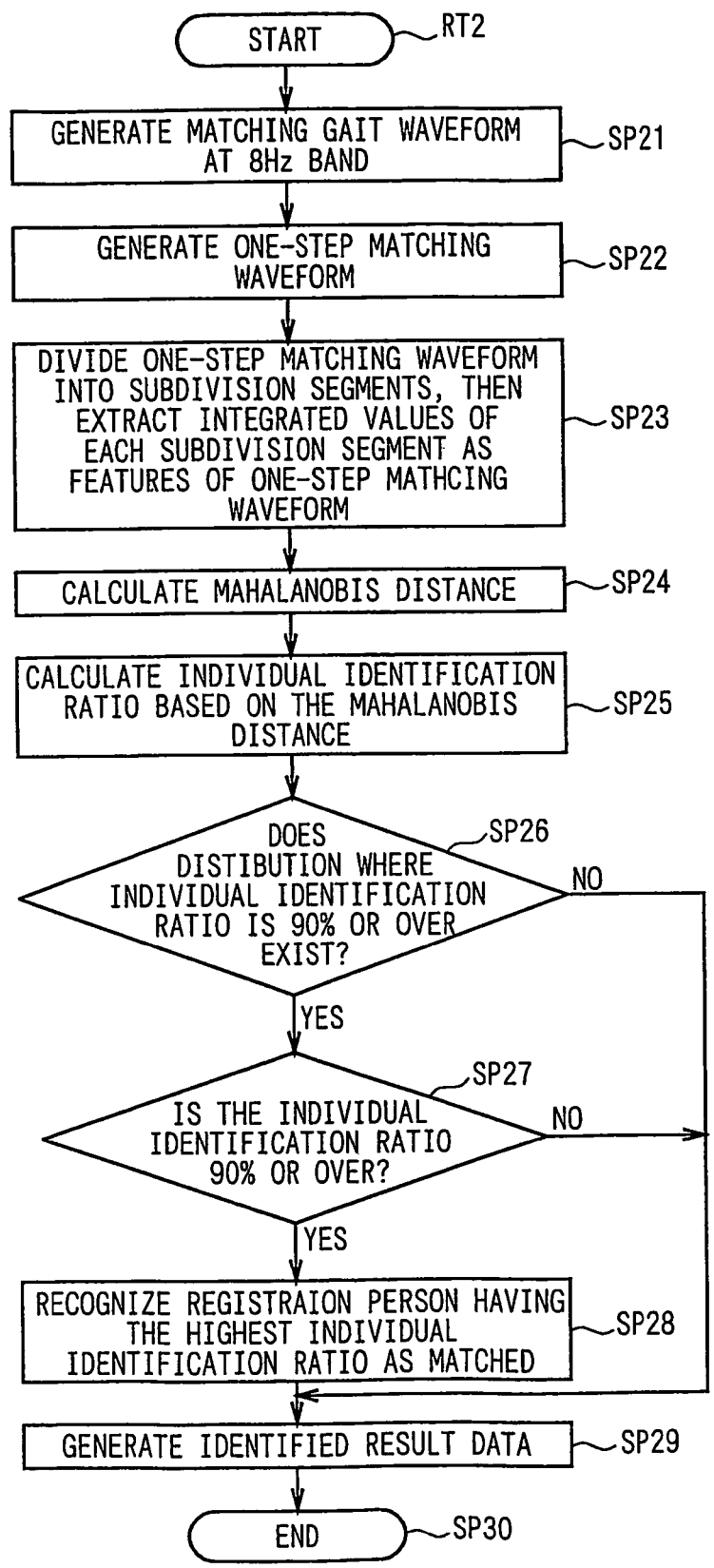
FIG. 11 A flow chart showing a procedure of a gait waveform matching process.
Figure 12:
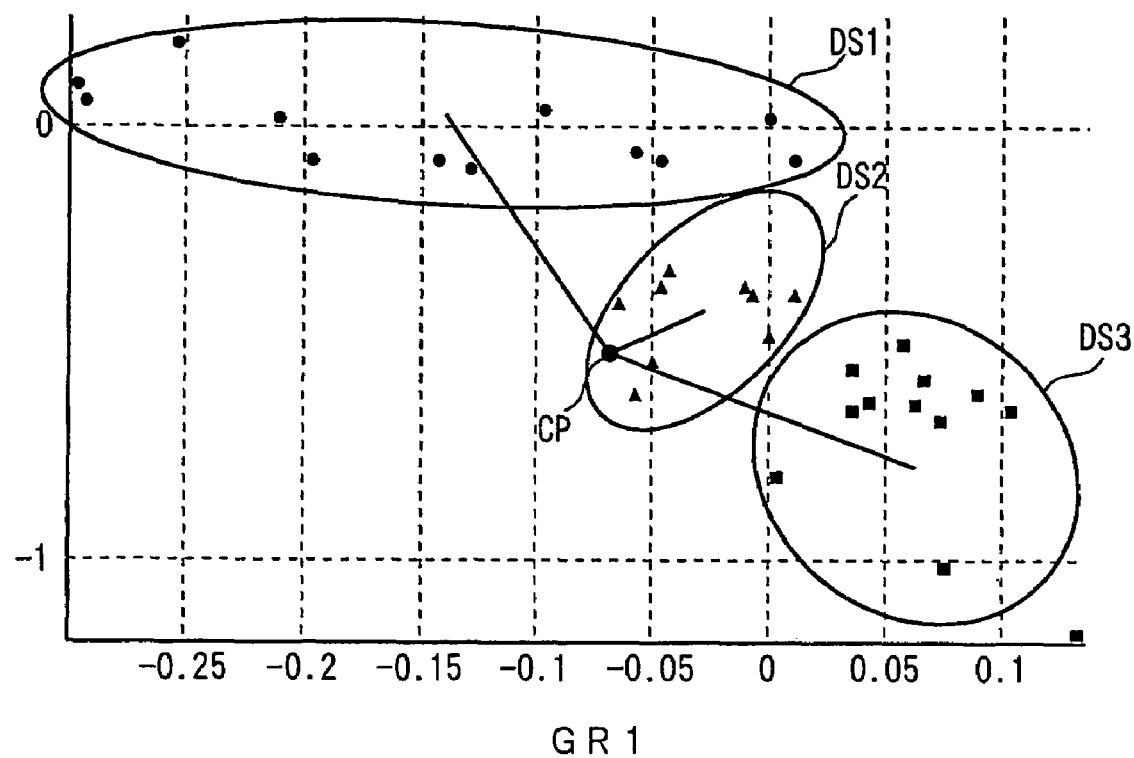
FIG. 12 A schematic diagram explaining the calculation of a Mahalanobis distance.

As shown in FIG. 11, the analysis part 3 starts at a start step of a routine RT2, goes on to a step SP21 to execute each process of the steps SP1, SP2, and SP3 of the above-mentioned routine RT1 (FIG. 1) on a matching gait wave signal S2 per prescribed unit of time provided from the electric field displacement detection part 2 so that a matching gait waveform at 8 Hz band representing a waveform removed of waveforms representing movements other than normal walking movements can be generated, then goes on to a next step SP22.

At the step SP22, in the same manner as the step SP4, the analysis part 3 generates one step of a one-step matching waveform by dividing the matching gait waveform at 8 Hz band obtained at the step SP21 by the one-step section unit SU (FIG. 8), then goes on to a next step SP23.

At the step SP23, the analysis part 3 divides the one-step matching waveform taken at the step SP22 into the same number of subdivision segments as the number of times dividing at the step SP6, for example, into twenty-one subdivision segments CSU1 to CSU21 (FIG. 8).

Then, the analysis part 3 extracts integrated values obtained by integrating electric field strength (electric potential) on the subdivision segments CSU1 to CSU21 as features of the one-step matching waveform, then goes onto a next step SP24.

At the step SP24, the analysis part 3, as shown in FIG. 11, calculates the Mahalanobis distance between the integrated value CP of the subdivision segment CSU1 extracted at the step SP24 and the barycentric position of, for example, the distribution DS1 to DS3 of the three registration waveform feature parameter groups GR1s corresponding to the subdivision segment CSU1 of three registration persons. The quantity r in $$r^2 = (x - m_x)' C_x^{-1} (x - m_x) \quad (3)$$

is called the Mahalanobis distance from the feature vector x to the mean vector $m_x$, where $C_x$ is the covariance matrix for x.

Furthermore, the analysis part 3 calculates the Mahalanobis distance for the integrated values of the subdivision segments CSU2 to CSU21 in the same manner, then goes on to a next step SP25. At the step SP25, the analysis part 3, for each of the three registration persons, totals the Mahalanobis distances calculated on the three registration persons and for each of the subdivision segments CSU1 to CSU21 at the step SP24, and based on the Mahalanobis distance totaled for each of the registration persons, calculates an individual identification ratio representing the ratio of the possibility that the matching target person can be identified as one of the registration persons him/herself for each, then goes on to a next step SP26.

In practice, the analysis part 3 is configured to calculate a higher individual identification ratio as the totaled Mahalanobis distance is shorter, and on the contrary, calculate a lower individual identification ratio as the totaled Mahalanobis distance is longer.

At the step SP26, the analysis part 3 judges whether one or more of a plurality of the individual identification ratios calculated at the step SP25 is/are 90% or higher, or not. Alternatively, other thresholds may be used such as 75% or greater, or 85% or greater or even any threshold between 75% and 100% inclusive. A negative result means that the one-step matching waveform of the matching target person has a low matching ratio with the one-step registration waveforms of the registration persons previously stored in the memory 5, in other words, the matching target person cannot be identified as one of the registration persons him/herself identification, and accordingly, the analysis part 3 identifies the matching target person as not one of the registration persons, and then goes onto a next step SP29.

On the contrary, an affirmative result means that the matching target person is appropriate as one of the registration persons, and the analysis part 3 goes on to a next step SP27.

At the step SP27, the analysis part 3 judges whether there exist two or more individual identification ratios which are 90% or higher among the plurality of the individual identification ratio calculated at the step SP25, or not. A negative result means that there exists just one applicant as a registration person who should be identified as the matching target person him/herself, therefore, the analysis part 3 identifies the registration person being an applicant as the matching target person, then goes onto a next step SP29.

On the contrary, an affirmative result means that there exist two or more applicants as registration person who could be identified as the matching target parson him/herself, and the analysis part 3 goes on to a next step SP28 to identify the registration person having the highest and at least 90% individual identification ratio as the matching target person, then goes onto a next step SP29.

At the step SP29, the analysis part 3 generates identification result data D2 corresponding to the identified result at the step SP26, SP27 or SP28 (FIG. 1), transmits the data to the output part 6, and then goes on to a next step SP30 to end the gait waveform matching process.

When there exist two or more registration persons having the highest and at least 90% individual identification ratio, the analysis part 3 is configured to transmit the information as identification result data D2 to the output part 6.

As described above, the analysis part 3 takes out a one-step matching waveform using, as an index, an 8 Hz peak using, as an index, an 8 Hz peak appearing at an almost constant interval regardless of differences of walking patterns, and extracts integrated values on the same number of subdivision segments CSU1 to CSU21 (FIG. 8) as the number of times dividing during a gait waveform process as features of the one-step matching waveform, then identifies whether the matching target person is one of the registration persons based on a Mahalanobis distance between the distribution of the registration waveform feature parameter groups GR1 to GR21, or not, therefore, can match the registration persons and the matching target person by matching the corresponding part of the waveforms of one step of the registration persons and the matching target person, so that the matching target person can be precisely identified. Once identified, the system produces a result that may be used in any one of a number of ways. For example, once the system recognizes a person, the system may produce a visual or audio signal to announce the fact that a match has been made. Alternatively, the system may use the recognition event to trigger a control signal for actuating a device (e.g., a door so the person can enter).

In the above-mentioned construction, the individual identification system 1 is configured to detect the change of the electrostatic capacity formed between the road surface and the bottom surfaces of feet in accordance with human walking movements, and the relative change of electric field displacement formed on the human body caused by the changes of electric charges between the road surface and the bottom surfaces of feet as a gait waveform signal S1 or S2 by the electric field displacement detection part 2.

In this case, as the changes of electrostatic capacity and of electric charges spread wide at an extremely low frequency band, the individual identification system 1 can detect the relative changes of electric field displacement without being influenced by the position of the electric field displacement detection part 2, and from noise such as a hum noise and a noise around the electric field displacement detection part 2 as a gait waveform signal S1 or S2.

At this state, the individual identification system 1 is configured to specify a one-step waveform using, as an index, one of the gait waves of the gait waveform signal S1 and S2, which is a distinctive 8 Hz peak at 8 Hz±2 Hz bandwidth appearing corresponding to the state where a whole bottom surface of one foot is in contact with the ground and a toe of the other foot is at right after leaving the ground (shown in FIG. 4, inside of the dotted line).

In this case, the individual identification system 1 can use the maximum peak amplitude appearing without influence from the electric-charge interference between the right and left legs as an index, and therefore, can accurately specify a one-step waveform which exactly reflects an actual one step of walking movements even when the walking movements appear with a unique pattern corresponding to the differences between the right and left legs or differences of walking patterns among individuals.

Furthermore, the individual identification system 1 divides the one-step waveform into a plurality of subdivision segments CSU1 to CSU21 (FIG. 8), and extracts integrated values obtained by integrating the amplitude values each on each of the divided subdivision segments CSU1 to CSU21 as features of the waveform of the one-step waveform, so that a detailed approximate form of the one-step waveform can be represented, therefore, the individual identification system 1 can precisely identify individuals without matching the one-step waveform itself.

With above-mentioned construction, one-step waveform corresponding to one step of walking movements can be specified using, as an index, an 8 Hz peak corresponding to the state where a whole bottom surface of one foot is in contact with the ground and a toe of the other foot is at right after leaving the ground among the electric field displacement formed on a human body in accordance with the human body's walking movements, and based on the specified one-step waveform, the features of the one-step waveform are extracted, so that the maximum peak amplitude appearing without influenced from electric-charged interference between the right and left legs can be the index and accordingly one-step waveform exactly reflecting the actual one step of the walking movements can be accurately specified, therefore, the features of the one-step waveform can be precisely extracted.

The description above has dealt with the case where the analysis part 3 analyzes the electric field displacement formed on a human body in accordance with the human body's walking movements, however, is not limited to this and electric field displacement formed on a human body in accordance with movements such as brisk walking, going up and down the stairs, or stepping, to sum up, any two-leg-walking movements where the bottom surface of one foot is in contact with the ground and the toe of the other foot is at just after leaving the ground can be the target for the analysis.

In this case, the maximum peak amplitude of the gait waveform varies corresponding to the movement speed between the state of right (or left) leg's completed landing and the state right after the right (or left) leg's toe leaves the ground, therefore, to acquire the same effect as described above, the analysis part 3 is required to use the peak amplitude appearing at the frequency band corresponding to the movement speed between the state of a completed landing of the right (or left) leg and the state right after the toe of the right (or left) leg leaves the ground during the two-leg-walking movements to be the detection target as a replacement of the 8 Hz peak for detection.

Furthermore, the embodiment described above has dealt with the case where the gait of a body, to which the electric field displacement detection part 2 is directly connected, is detected where the person is regarded as a registration person or a matching target person, however, is not limited to this and a person being around the person having the electric field displacement detection part 2 directly connected can be a registration person or a matching target person whose gait should be detected.

In this case, the amplitude experiences a time series increase in accordance with an approach, therefore the analysis part 3 can precisely detect the gait of the registration person or the matching target person who is at a relatively far position from the body having the electric field displacement detection part 2 directly connected as the electrostatic field displacement spread extremely wide on the body in accordance with the body's walking movements if the analysis part 3 previously stores the corresponding relationship between the distance between the individual identification system 1 and the position of the detection target, and the peak amplitude being an 8 Hz peak.

Furthermore, the above-description has dealt with the case where the electric field displacement detection part 2 is directly connected to the outer skin of a body OS, however, is not limited to this and the electric field displacement detection part 2 can be connected to various kinds of conductors, and for example, can be installed on a mobile phone or a pedometer, or be placed on a metal pole or a desk.

In this case, the present invention can be used not only for identifying individuals, but also for various kinds of purposes relating to two-leg-walking movements, for example, for analyzing walking patterns of patients (walkers) at medical institutions, and for identifying a human body from bodies of animals at biometrics field.

Furthermore, the embodiment described above has dealt with the case with construction where the electric field detection part 2 is used as an electric field displacement detection means as described above, however, is not limited to this, and the present invention can be configured to use, as a replacement of the electric field detection part 2, a magnetometric sensor called as a Superconducting Quantum Interference Device (SQID) in which joint parts (Josephson junctions) being superconducting are placed in parallel with microfabricated superconduction thin films.

Furthermore, the embodiment described above has dealt with the case where an analysis part 3 and an electric field detection part 2 are set up as an identification means in an individual identification system 1, but is not limited to this, and each of the electric field detection part 2 and the analysis part 3 can be separately set up individually.

Furthermore, the embodiment described above has dealt with the case where a one-step waveform is divided into a plurality of subdivision segments CSU1 to CSU21 (FIG. 8), and the integrated values obtained by calculating for each of the subdivision segments CSU1 to CSU21 are extracted as the features of the one-step waveform, however, is not limited to this, and the amplitude values at the division of the plurality of the subdivision segments CSU1 to CSU21 (FIG. 8) without being integrated can be extracted as the features of the one-step waveform.

Furthermore, the embodiment described above has dealt with the case where each process at the analysis part 3 is realized by an analysis program, however, is not limited to this, and a part of or all of the processes can be realized by a hardware means such as a dedicated integrated circuit, such as an ASIC or a FPGA.

Furthermore, the embodiment described above has dealt with the case where the above-described gait waveform registration process (FIG. 7) and the gait waveform matching process (FIG. 11) are executed in accordance with analysis programs previously stored in the memory 5, however, is not limited to this, and the gait waveform registration process and the gait waveform matching process can be executed by installing a program storage medium for storing the analysis programs in an information processing device.

In this case, as a program storage medium for installing the analysis programs for executing the gait waveform registration process and the gait waveform matching process in the information processing device for a executable state, for example, can be not only package media such as a flexible disk, a compact disk-read only memory (CD-ROM), and a digital versatile disc (DVD), but also a semiconductor memory or a magnetic disk in which programs are temporally or permanently stored. In addition, as a means for storing analysis programs in such program storage medium, wired or wireless communication medium such as a local area network, the internet, and a digital satellite broadcast can be used, and storing can be made through various communication interfaces such as a router and a modem.

According to the present invention as described above, a one-step waveform corresponding to the one step of two-leg-walking movements is specified using, as an index, peak amplitude at a prescribed frequency band corresponding to the state where a whole bottom surface of one foot is in contact with the ground and a toe of the other foot is at just after leaving the ground among the electric field displacement formed on the human body in accordance with his/her two-leg-walking movements, and based on the specified one-step waveform, the features of the one-step waveform are extracted, so that maximum peak amplitude appearing without influenced from electric-charged interference between the right and left legs can be the index and accordingly one-step waveform exactly reflecting the actual one step of the walking movements can be accurately specified, therefore, the features of the one-step waveform can be precisely extracted.

The present patent document is related to Japanese priority document JP 2002-314920, filed in the Japanese Patent Office on Oct. 29, 2002, the entire contents of which being incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A gait waveform feature extracting method comprising:
    specifying a one-step waveform from a portion of a digital signal, said digital signal corresponding to an electric field displacement formed on a body of a subject in accordance with a two-leg-walking movement of said subject, said specifying including
        associating as an index of said one-step waveform a peak amplitude in a predetermined frequency band, said peak amplitude corresponding to a state where approximately a whole bottom surface of a first foot of said subject is in contact with a walking surface and a toe of a second foot of said subject is just after leaving the walking surface;
    extracting features of said one-step waveform after said one-step waveform is specified in said specifying step; and
    identifying said subject based on said features extracted by said extracting.

2. The gait waveform feature extracting method according to claim 1, wherein said predetermined frequency band is in an inclusive range of 6 Hz through 10 Hz.

3. The gait waveform feature extracting method according to claim 1, further comprising:
    retrieving the digital signal from memory.

4. The gait waveform feature extracting method according to claim 1, wherein said identifying includes
    comparing said features of said one-step waveform against a second waveform stored in memory; and
    determining that said one-step waveform matches said second waveform when said features of said one-step waveform are within a predetermined criteria of corresponding features of said second waveform.

5. The gait waveform feature extracting method according to claim 4, further comprising:
    generating a control signal; and
    actuating another device once said determining determines that the one-step waveform matches said second waveform.

6. The gait waveform feature extracting method according to claim 5, wherein said actuating includes at least one of actuating a visual display, actuating an audio alarm, and opening a lock.

7. The gait waveform feature extracting method according to claim 5, wherein said determining includes calculating a Mahalanobis distance from said features of said first waveform.

8. The gait waveform feature extracting method according to claim 1, wherein said extracting step includes dividing said one-step waveform by an interval so as to create divided intervals, and extracting as the features of said one-step waveform integrated values obtained by integrating amplitude values of said divided intervals.

9. The gait waveform feature extracting method according to claim 1, further comprising:
    generating said digital signal with an electric field displacement detector.

10. The gait waveform feature extracting method according to claim 9, wherein said generating includes producing said digital signal as a wireless signal.

11. The gait waveform feature extracting method according to claim 10, wherein said extracting is performed in an analysis device that is separate from said electric field displacement detector.

12. An individual identification system comprising:
    an electric field displacement detector configured to detect an electric field displacement formed on a body of a subject in accordance with a two-leg-walking movement of said subject and produce a signal that corresponds with the electric field displacement; and
    a processor configured to identify from said signal an individual using, as an index, a peak amplitude of said signal, in a predetermined frequency band, that corresponds to a state where approximately a whole bottom surface of a first foot of said subject is in contact with a walking surface and a toe of a second foot is just after leaving the walking surface.

13. The individual identification system according to claim 12, wherein said predetermined frequency band is in an inclusive range of 6 Hz through 10 Hz.

14. The individual identification system according to claim 13, further comprising:
    a memory configured to hold features of a second waveform associated with the individual,
    wherein said processor is configured to compare said features of said one-step waveform against the second waveform stored in memory, and determine that said one-step waveform matches said second waveform when said features of said one-step waveform are within a predetermined criteria of corresponding features of said second waveform.

15. The individual identification system according to claim 14, wherein said electric field displacement detector is configured to generate a control signal when said processor determines that said one-step waveform matches said second waveform; and said processor is configured to actuate another device after receiving said control signal once said determining step determines that the one-step waveform matches said second waveform.

16. The individual identification system according to claim 15, wherein said another device being at least one of a visual display, an audio alarm mechanism, and a controllable lock.

17. The individual identification system according to claim 14, wherein said processor is configured to calculate a Mahalanobis distance from said features of said first waveform.

18. The individual identification system according to claim 15, wherein said electric field displacement detector includes a transmitter configured to transmit said control signal as a wireless signal.

19. The individual identification system according to claim 14, wherein said electric field displacement detector is separate from said processor.

20. An individual identification system comprising:
    means for detecting an electric field displacement formed on a subject in accordance with a two-leg-walking movement of said subject to generate a waveform; and
    means for comparing said waveform with predetermined waveforms associated with different individuals so as to identify a predetermined individual based on said electric field displacement.

* * * * *